(12) United States Patent
Do et al.

(10) Patent No.: US 8,549,834 B2
(45) Date of Patent: Oct. 8, 2013

(54) GAS TURBINE ENGINE WITH VARIABLE AREA FAN NOZZLE

(75) Inventors: Logan H. Do, Canton, CT (US); Edward A. Krystowski, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 319 days.

(21) Appl. No.: 12/909,793

(22) Filed: Oct. 21, 2010

(65) Prior Publication Data

US 2012/0096831 A1    Apr. 26, 2012

(51) Int. Cl.
*F02K 3/02*    (2006.01)

(52) U.S. Cl.
USPC .......... 60/226.3; 60/226.1; 60/226.2; 60/771; 244/110 B; 239/265.29; 181/213; 181/215

(58) Field of Classification Search
USPC ...... 60/226.1, 226.2, 226.3, 771; 244/110 B; 239/265.29; 181/213, 215
See application file for complete search history.

(56) References Cited

U.S. PATENT DOCUMENTS

| | | | |
|---|---|---|---|
| 2,934,966 A | 5/1960 | Wood |
| 2,980,199 A | 4/1961 | Keen |
| 3,484,847 A | 12/1969 | Poole |
| 3,704,829 A | 12/1972 | Hall |
| 3,724,759 A | 4/1973 | Ellis |
| 3,779,010 A | 12/1973 | Chamay et al. |
| 3,820,719 A | 6/1974 | Clark |
| 4,044,973 A | 8/1977 | Moorehead |
| 4,068,469 A | 1/1978 | Adamson |
| 4,132,068 A | 1/1979 | Johnston |
| 4,147,027 A | 4/1979 | Greathouse |
| 4,205,813 A | 6/1980 | Evans et al. |
| 4,291,782 A | 9/1981 | Klees |
| 4,301,980 A | 11/1981 | Bradfield et al. |
| 4,327,548 A | 5/1982 | Woodward |
| 4,409,788 A | 10/1983 | Nash et al. |
| 4,410,150 A | 10/1983 | Lahti |
| 4,466,587 A | 8/1984 | Dusa et al. |
| 4,505,443 A | 3/1985 | Bradfield et al. |
| 4,922,712 A | 5/1990 | Matta et al. |

(Continued)

FOREIGN PATENT DOCUMENTS

| | | | |
|---|---|---|---|
| GB | 2372779 A | * | 9/2002 |
| WO | 2007122368 | | 11/2007 |

OTHER PUBLICATIONS

European Search Report for EP Application No. 11186217.3-1607 completed Jul. 11, 2013.

*Primary Examiner* — Gerald L Sung
*Assistant Examiner* — Craig Kim
(74) *Attorney, Agent, or Firm* — Carlson, Gaskey & Olds, P.C.

(57) ABSTRACT

A nacelle assembly for a bypass gas turbine engine includes a variable area fan nozzle having a first fan nacelle section and a second fan nacelle section. The variable area fan nozzle is in communication with a fan bypass flow path, the first fan nacelle section defines an intermittent trailing edge which defines a multiple of ports and the second fan nacelle section defines a multiple of doors, each of the multiple of doors match each of the multiple of ports such that a fan nacelle trailing edge is continuous when the second fan nacelle section is selectively translated to a closed position relative to the first fan nacelle section.

19 Claims, 9 Drawing Sheets

(56) References Cited

U.S. PATENT DOCUMENTS

| | | | |
|---|---|---|---|
| 4,922,713 A | 5/1990 | Barbarin et al. |
| 5,029,514 A | 7/1991 | Pickard |
| 5,082,182 A | 1/1992 | Bruchez, Jr. et al. |
| 5,107,675 A | 4/1992 | Roberts |
| 5,120,005 A | 6/1992 | Reedy |
| 5,150,839 A | 9/1992 | Reedy |
| 5,181,676 A | 1/1993 | Lair |
| 5,201,800 A | 4/1993 | Wolf |
| 5,221,048 A | 6/1993 | Lair |
| 5,261,227 A | 11/1993 | Giffin, III |
| 5,261,605 A | 11/1993 | McLafferty et al. |
| 5,315,821 A | 5/1994 | Dunbar et al. |
| 5,329,763 A | 7/1994 | Ibarreche Mendia et al. |
| 5,359,851 A | 11/1994 | Bannerot et al. |
| 5,485,959 A | 1/1996 | Wood et al. |
| 5,655,360 A | 8/1997 | Butler |
| 5,685,141 A | 11/1997 | Markstein et al. |
| 5,694,767 A | 12/1997 | Vdoviak et al. |
| 5,722,231 A | 3/1998 | Porte |
| 5,743,488 A | 4/1998 | Rolston et al. |
| 5,778,659 A | 7/1998 | Duesler et al. |
| 5,779,152 A | 7/1998 | Renggli et al. |
| 5,779,192 A | 7/1998 | Metezeau et al. |
| 5,806,302 A | 9/1998 | Cariola et al. |
| 5,819,527 A | 10/1998 | Fournier |
| 5,826,823 A | 10/1998 | Lymons et al. |
| 5,833,140 A | 11/1998 | Loffredo et al. |
| 5,853,148 A | 12/1998 | Standish et al. |
| 5,863,014 A | 1/1999 | Standish |
| 5,875,995 A | 3/1999 | Moe et al. |
| 5,913,476 A | 6/1999 | Gonidec et al. |
| 5,934,613 A | 8/1999 | Standish et al. |
| 6,067,793 A | 5/2000 | Urruela et al. |
| 6,070,407 A | 6/2000 | Newton |
| 6,094,908 A | 8/2000 | Baudu et al. |
| 6,101,807 A | 8/2000 | Gonidec et al. |
| 6,102,307 A | 8/2000 | Elorriaga et al. |
| 6,148,608 A | 11/2000 | Martin et al. |
| 6,167,694 B1 | 1/2001 | Davies |
| 6,212,877 B1 | 4/2001 | Renggli |
| 6,318,070 B1 | 11/2001 | Rey et al. |
| 6,340,135 B1 | 1/2002 | Barton |
| 6,360,527 B1 | 3/2002 | Feder et al. |
| 6,378,781 B1 | 4/2002 | Vicario |
| 6,415,599 B1 | 7/2002 | Ausdenmoore et al. |
| 6,439,840 B1 | 8/2002 | Tse |
| 6,505,706 B2 | 1/2003 | Tse |
| 6,543,224 B1 | 4/2003 | Barooah |
| 6,598,386 B2 | 7/2003 | Johnson et al. |
| 6,640,537 B2 | 11/2003 | Tse |
| 6,718,752 B2 | 4/2004 | Nesbitt et al. |
| 6,748,744 B2 | 6/2004 | Peplow et al. |
| 6,751,944 B2 | 6/2004 | Lair |
| 6,769,868 B2 | 8/2004 | Harrold |
| 6,813,877 B2 | 11/2004 | Birch et al. |
| 6,820,410 B2 | 11/2004 | Lair |
| 6,966,175 B2 | 11/2005 | Lair |
| 6,983,588 B2 | 1/2006 | Lair |
| 7,000,378 B2 | 2/2006 | Birch et al. |
| 7,013,650 B2 | 3/2006 | Mandet |
| 7,032,835 B2 | 4/2006 | Murphy et al. |
| 7,043,898 B2 | 5/2006 | Rago |
| 7,055,329 B2 | 6/2006 | Martens et al. |
| 7,093,423 B2 | 8/2006 | Gowda et al. |
| 7,093,793 B2 | 8/2006 | Lair |
| 7,216,831 B2 | 5/2007 | Wood |
| 7,458,221 B1 | 12/2008 | Arnold et al. |
| 7,637,095 B2 | 12/2009 | Winter et al. |
| 7,721,549 B2 | 5/2010 | Baran |
| 7,721,551 B2 | 5/2010 | Hanson |
| 2004/0112040 A1 | 6/2004 | Kortum et al. |
| 2005/0039437 A1* | 2/2005 | Lair ................ 60/204 |
| 2005/0126174 A1 | 6/2005 | Lair |
| 2005/0188676 A1* | 9/2005 | Lair ................ 60/226.3 |
| 2007/0234728 A1 | 10/2007 | Peters |
| 2008/0001039 A1 | 1/2008 | Winter et al. |
| 2008/0028763 A1 | 2/2008 | Schwarz et al. |
| 2008/0092548 A1 | 4/2008 | Morford et al. |
| 2008/0302907 A1 | 12/2008 | Schafer |
| 2010/0018213 A1* | 1/2010 | Migliaro, Jr. .......... 60/771 |
| 2010/0089028 A1* | 4/2010 | Baltas ............. 60/204 |
| 2010/0115958 A1 | 5/2010 | Parham |
| 2010/0139243 A1 | 6/2010 | Migliaro, Jr. |
| 2010/0170220 A1 | 7/2010 | Kohlenberg |

\* cited by examiner

GAS TURBINE ENGINE WITH VARIABLE AREA FAN NOZZLE

BACKGROUND

The present disclosure relates to a gas turbine engine, and more particularly to a turbofan engine having a variable area fan nozzle (VAFN).

Gas turbine engines which have an engine cycle modulated with a variable area fan nozzle (VAFN) provide a smaller fan exit nozzle during cruise conditions and a larger fan exit nozzle during take-off and landing conditions.

SUMMARY

A nacelle assembly for a bypass gas turbine engine according to an exemplary aspect of the present disclosure includes a variable area fan nozzle having a first fan nacelle section and a second fan nacelle section. The variable area fan nozzle is in communication with a fan bypass flow path, the first fan nacelle section defines an intermittent trailing edge which defines a multiple of ports and the second fan nacelle section defines a multiple of doors, each of the multiple of doors match each of the multiple of ports such that a fan nacelle trailing edge is continuous when the second fan nacelle section is selectively translated to a closed position relative to the first fan nacelle section.

A gas turbine engine according to an exemplary aspect of the present disclosure includes a core engine defined about an axis. A core nacelle defined at least partially about the core engine. A fan nacelle is mounted at least partially around the core nacelle to define a fan bypass flow path and a variable area fan nozzle having a first fan nacelle section and a second fan nacelle section. The variable area fan nozzle is in communication with a fan bypass flow path, the first fan nacelle section defines an intermittent trailing edge which defines a multiple of ports and the second fan nacelle section defines a multiple of doors, each of the multiple of doors match each of the multiple of ports such that a fan nacelle trailing edge is continuous when the second fan nacelle section is selectively translated to a closed position relative to the first fan nacelle section.

A method of varying a nozzle of a gas turbine engine according to an exemplary aspect of the present disclosure includes selective translating a second fan nacelle section that defines a multiple of doors relative a first fan nacelle section having a multiple of ports such that a fan nacelle trailing edge is continuous when the second fan nacelle section is selectively translated to a closed position and is intermittent when selectively translated to an open position.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
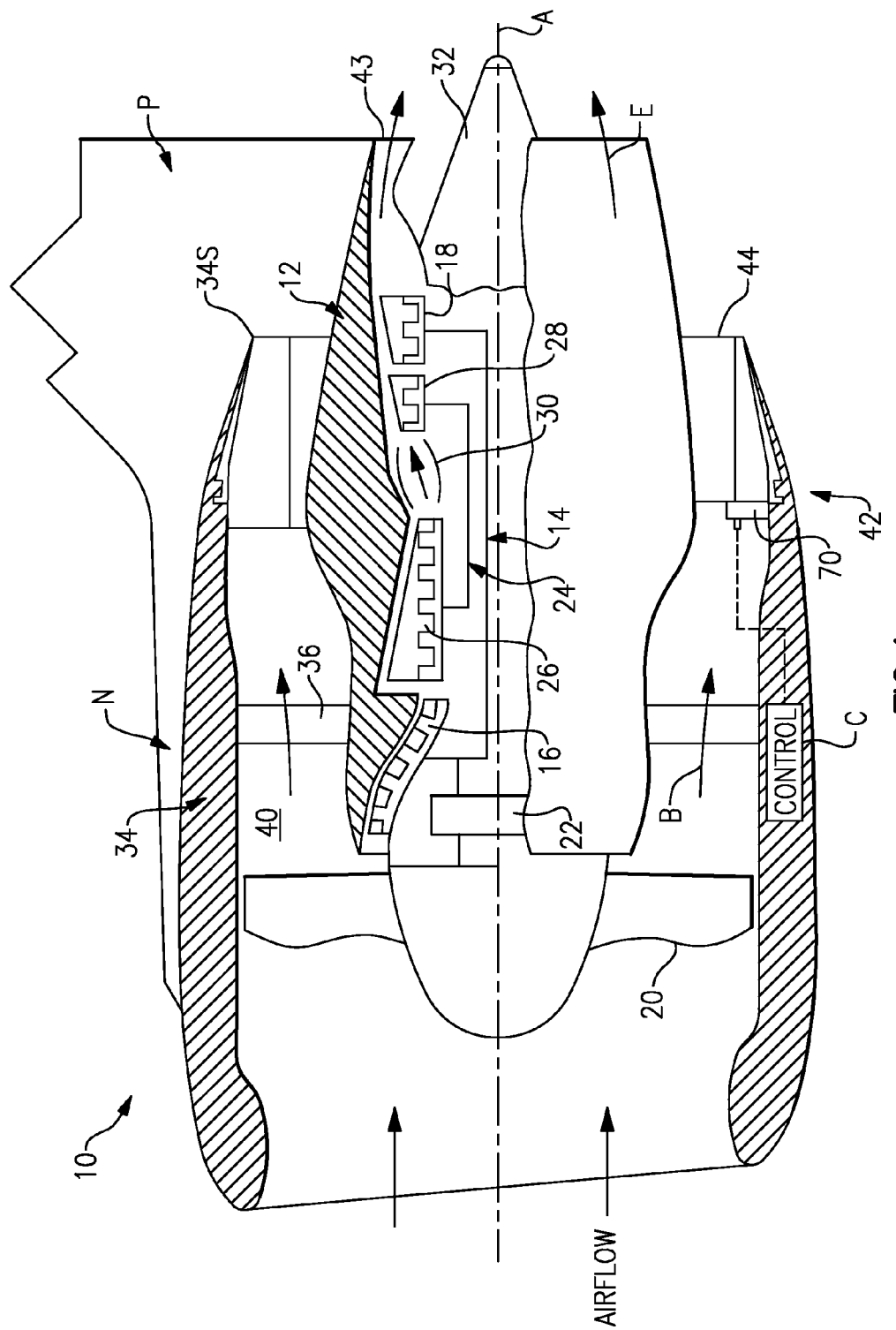
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N. The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a geared architecture 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a bypass geared architecture aircraft engine with a high bypass ratio and a turbofan diameter significantly larger than that of the low pressure compressor 16. The geared architecture 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle 34 which at least partially surrounds the core nacelle 12. A portion of airflow, referred to as core airflow, communicates into the core nacelle 12. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially spaced structures 36 often referred to as Fan Exit Guide Vanes (FEGVs). A bypass flow path 40 is defined between the core nacelle 12 and the fan nacelle 34. The engine 10 generates a high bypass flow arrangement with a bypass ratio in which a large portion of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle trailing edge 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the mass flow of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region and still provide the relatively smaller nozzle area necessary to obtain a high-efficiency fan operating line at cruise speeds.

A significant amount of thrust is provided by the bypass flow B due to the high bypass ratio. The fan section 20 of the engine 10 is designed for a particular flight condition—typically cruise at 0.8 M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 2:
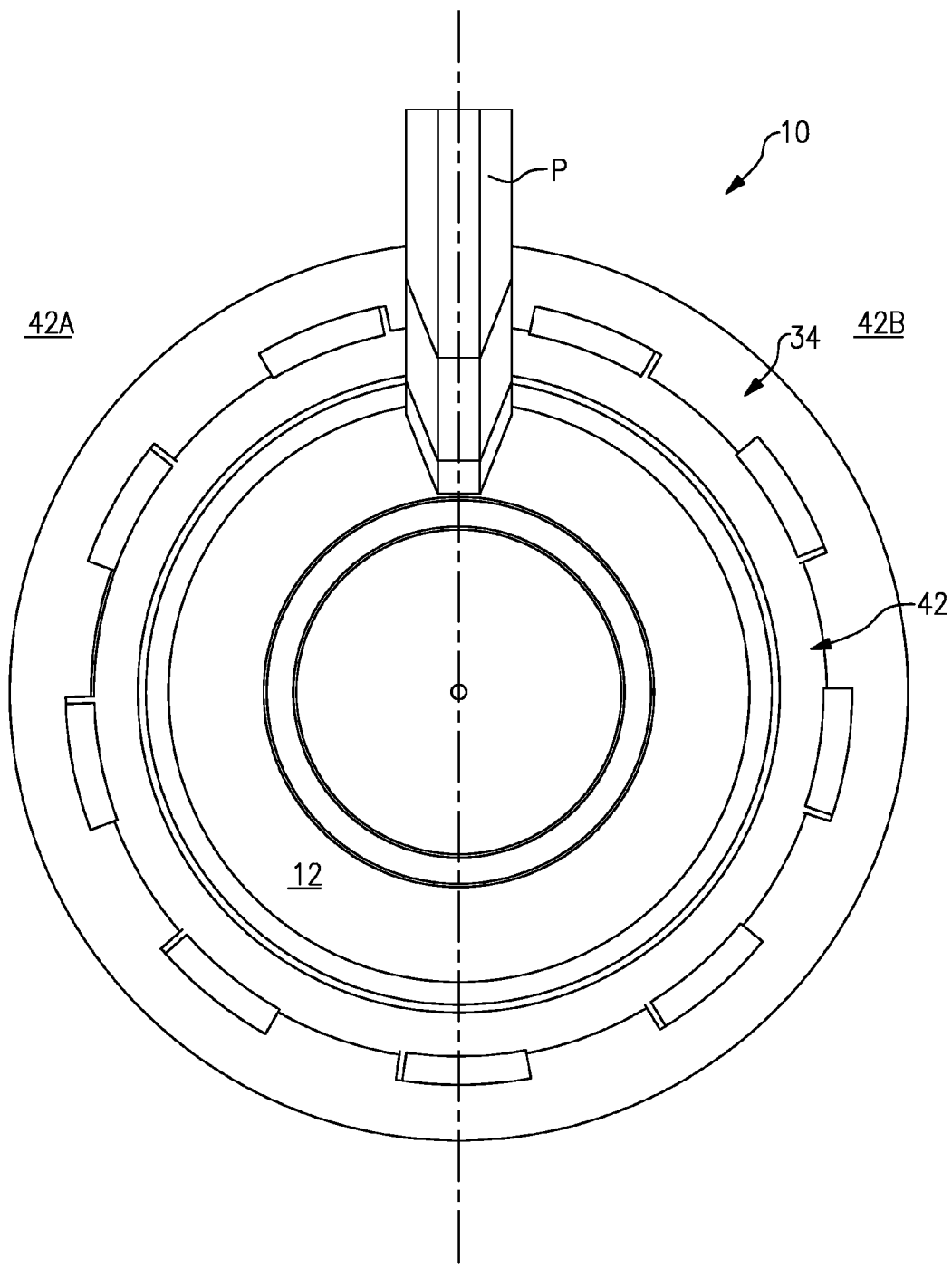
FIG. 2 is a rear view of the engine.

The VAFN 42 may be separated into at least two sectors 42A-42B (FIG. 2) defined between the pylon P and a lower Bi-Fi splitter L which may interconnect a larger diameter fan duct reverser cowl and a smaller diameter core cowl. It should be understood that although two segments are illustrated, any number of sectors may alternatively or additionally be provided.

Figure 3A:
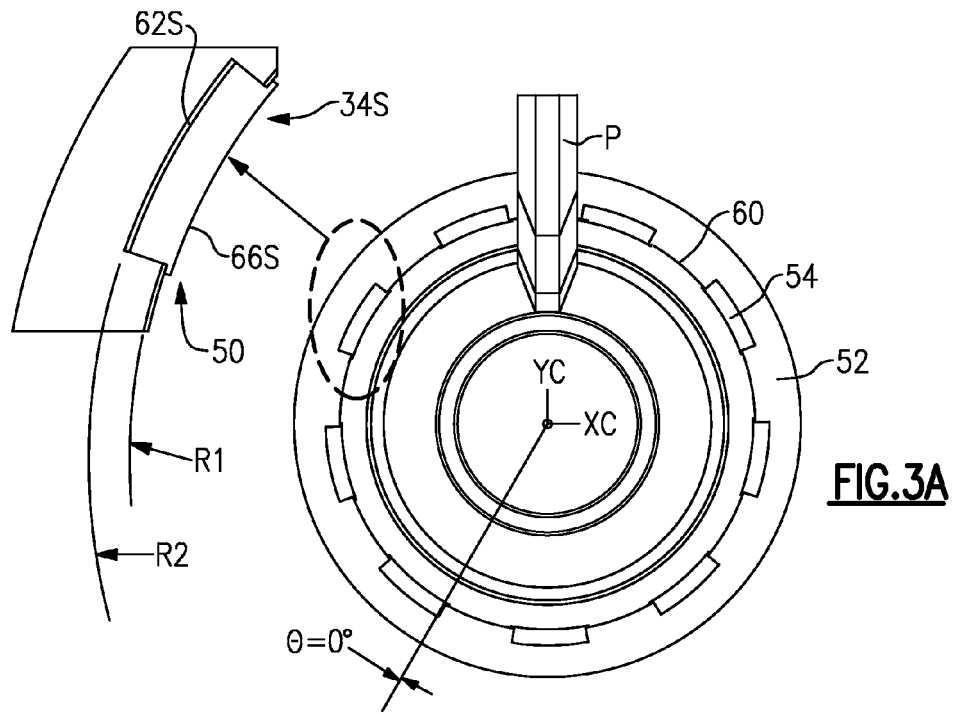
FIG. 3A is a rear view of the engine with the VAFN in a closed position.
Figure 3B:
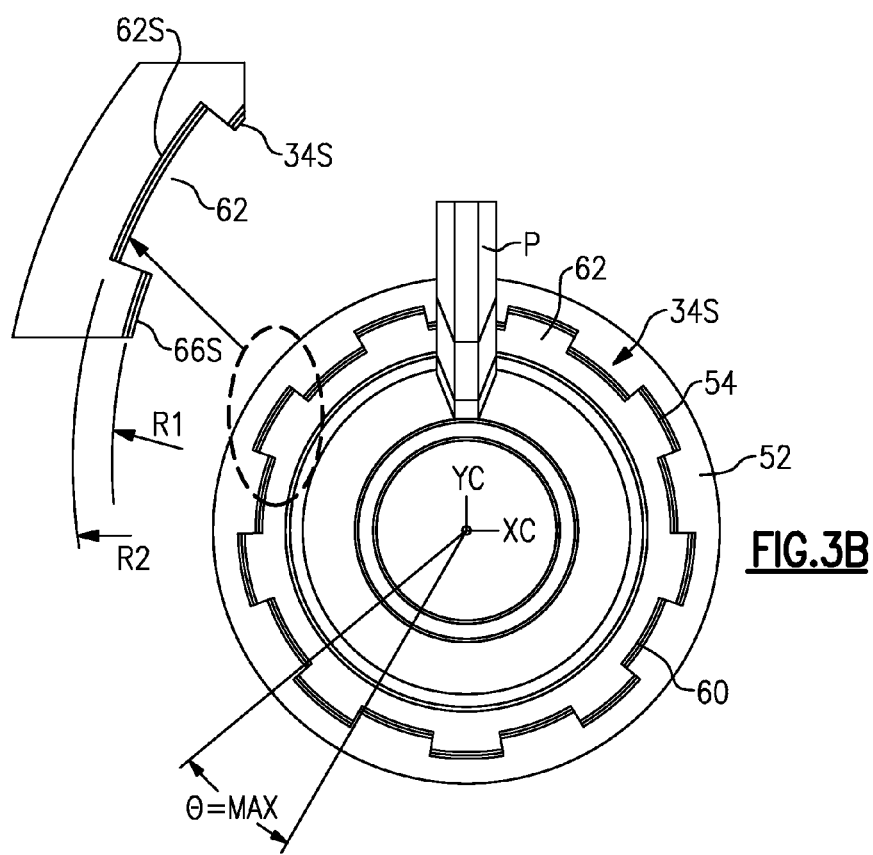
FIG. 3B is a rear view of the engine with the VAFN in an open position.

With reference to FIGS. 3A and 3B, the VAFN 42 selectively defines an auxiliary port system 50 with a first fan nacelle section 52 and a second fan nacelle section 54 rotationally mounted relative the first fan nacelle section 52. The first fan nacelle section 52 at least partially defines the fan nacelle trailing edge 34S with an intermittent trailing edge 60. The intermittent trailing edge 60, in one disclosed non-limiting embodiment provides a saw-tooth edge which forms a multiple of ports 62 (FIG. 3B). Each of the multiple of ports 62 has a port trailing edge 62S axially forward of the fan nacelle trailing edge 34S.

Figure 4:
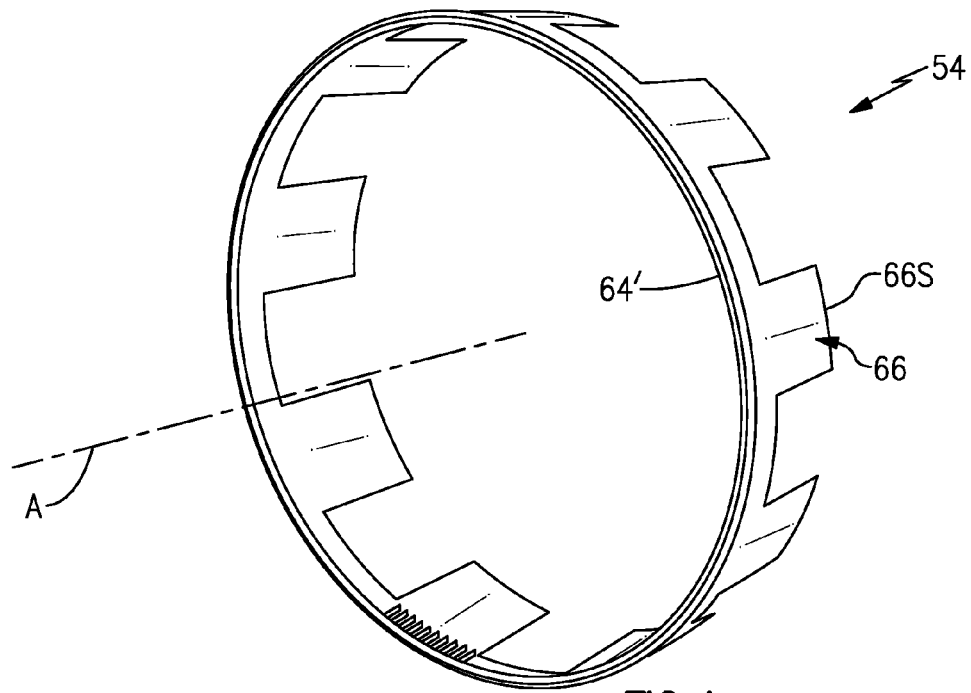
FIG. 4 is a perspective view of one non-limiting embodiment of a VAFN fan nacelle section.
Figure 6A:
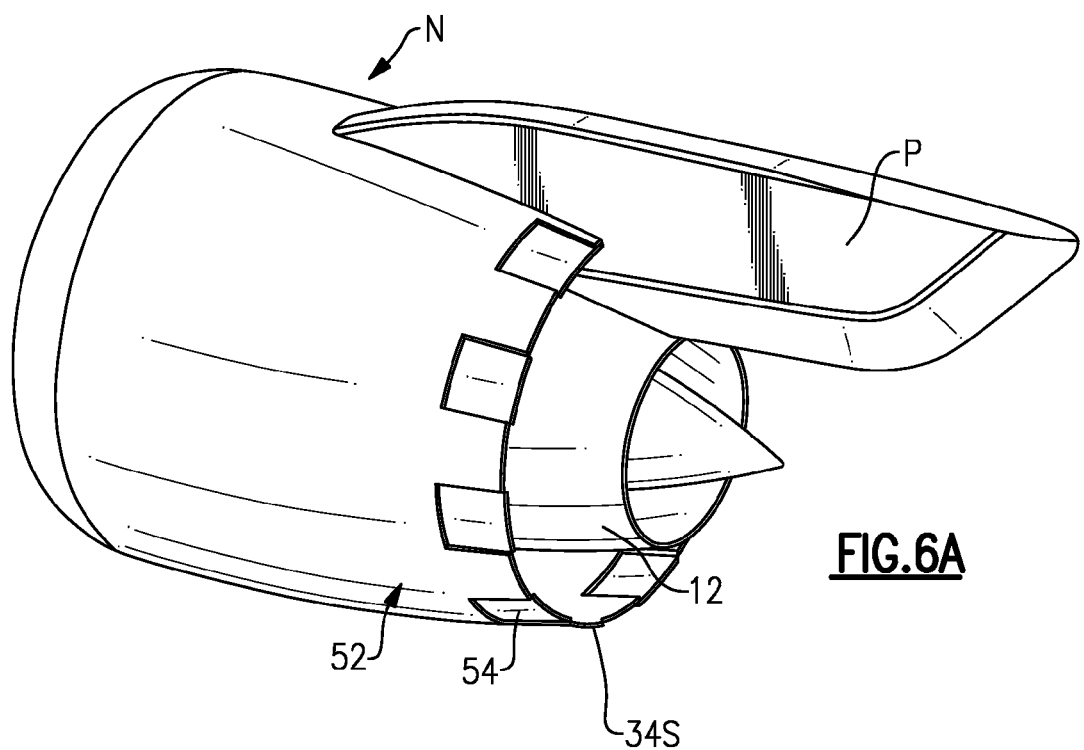
FIG. 6A is a perspective view of the VAFN in a closed position.

With reference to FIG. 4, the second fan nacelle section 54, in one non-limiting embodiment, may include circular ring portion 64 with a multiple of doors 66 which extend therefrom and match the multiple of ports 62. Each of the multiple of doors 66 has a door trailing edge 66S aligned with the fan nacelle trailing edge 34S (FIG. 6A). It should be understood that although the multiple of ports 62 and the multiple of doors 66 in the illustrated embodiment are generally rectilinear, other shapes or combinations of various shapes may alternatively be provided.

Figure 5:
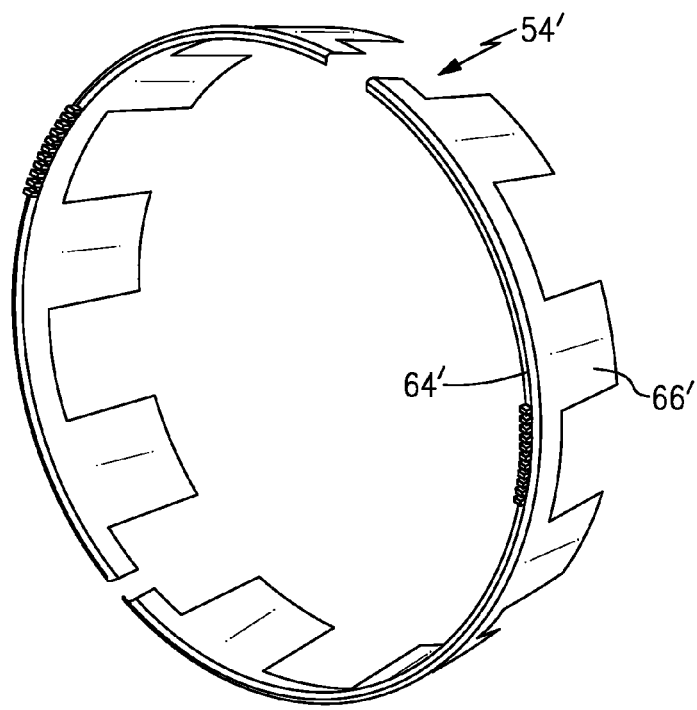
FIG. 5 is a perspective view of another non-limiting embodiment of a VAFN fan nacelle section.

In another non-limiting embodiment, the second fan nacelle section 54' may be defined by two semi-ring portions (FIG. 5) which correspond with the respective sectors 42A-42B (FIG. 2) defined between the pylon P and the lower Bi-Fi splitter L. The semi-ring portions of the second fan nacelle section 54' may facilitate rotational movement thereof.

Figure 6B:
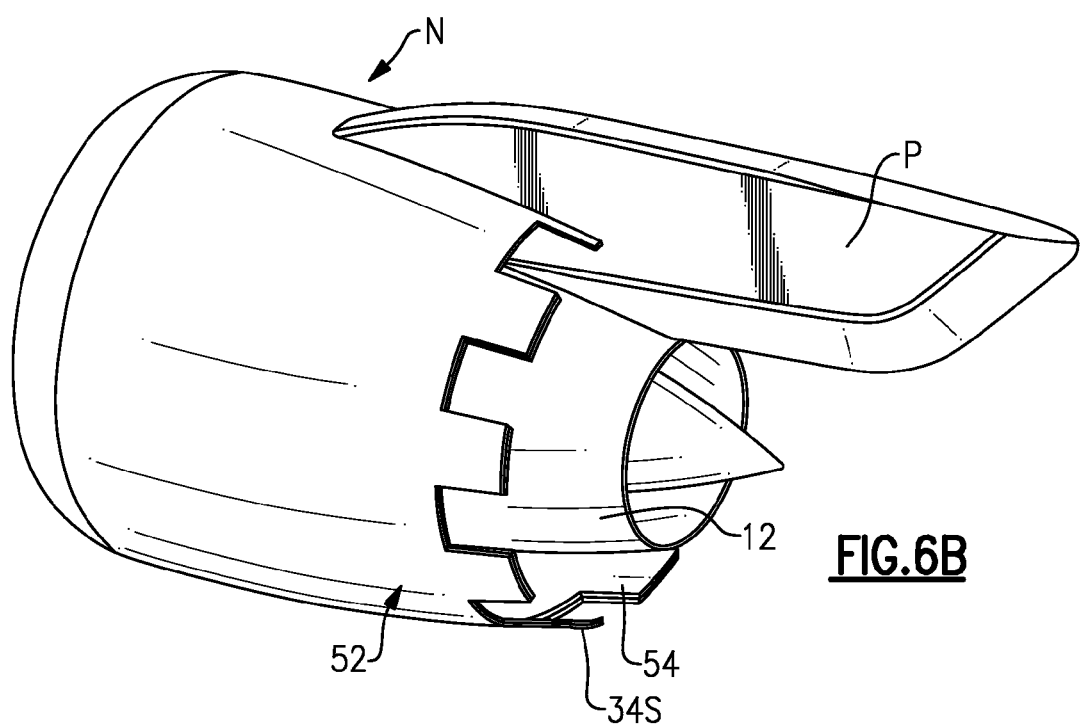
FIG. 6B is a perspective view of the VAFN in an open position.

The second fan nacelle section 54 is selectively translatable about the engine axis A relative the fixed first fan nacelle section 52 to change the effective area of the fan nozzle exit area 44 through selective opening of the ports 62. That is, the second fan nacelle section 54 may, in one non-limiting embodiment, rotate or otherwise move about the engine axis A. As the second fan nacelle section 54 selectively translates about the engine axis A, the ports 62 are either closed by the doors 66 in the second fan nacelle section 54 (FIG. 6A) or are opened by offset of the second fan nacelle section 54 relative the ports 62 (FIG. 6B). That is, each of the multiple of doors 66 match each of the multiple of ports 62 such that the fan nacelle trailing edge 34S is continuous when the second fan nacelle section 54 is selectively translated to the closed position relative the fixed first fan nacelle section 52 (FIG. 6A). Although the second fan nacelle section 54 is illustrated in the disclosed non-limning embodiment as being rotatable, relative the fixed first fan nacelle section 52, it should be understood that other translatable movement may alternatively or additionally be provided.

In operation, the VAFN 42 communicates with the controller C to selectively translate about the engine axis A the second fan nacelle section 54 relative the first fan nacelle section 52 through an actuator system 70 to change the fan nozzle exit area 44. It should be understood that various control systems including an engine controller or an aircraft flight control system may also be usable with the present application. The VAFN 42 changes the physical area and geometry of the bypass flow path 40 during particular flight modes to accommodate optimum conditions for the engine such as the Fan Pressure Ratio (FPR) that is varied in response to particular flight modes.

Figure 7:
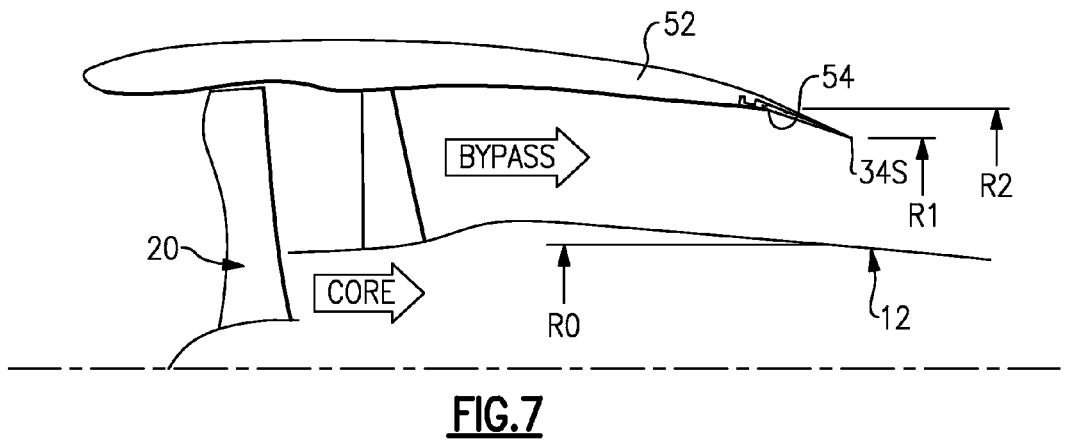
FIG. 7 is a schematic view which illustrates a modulation in the fan nozzle exit area provided by the VAFN.

With reference to FIG. 7, the bypass flow B is effectively altered by rotation of the second fan nacelle section 54 relative the first fan nacelle section 52 between a closed position (FIGS. 3A and 6A) and an open position (FIGS. 3B and 6B). Rotation of the second fan nacelle section 54 to close the multiple of ports 62 of the auxiliary port system 60 decrease the fan nozzle exit area 44 toward exit area R1. Rotation of the second fan nacelle section 54 to open the ports 62 opens the auxiliary port system 60 to increase the fan nozzle exit area 44 toward exit area R2. That is, exit area R2 is greater than exit area R1.

Figure 8:
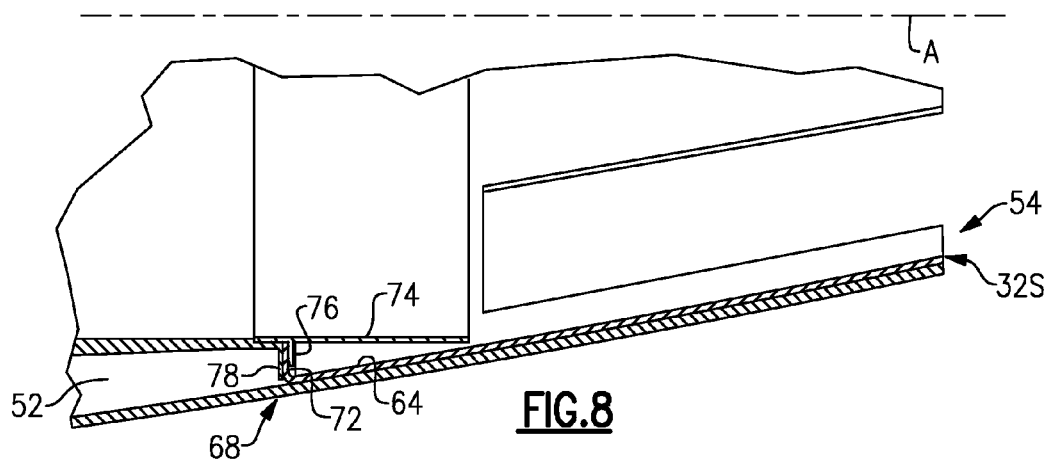
FIG. 8 is a sectional view of an interface between the second fan nacelle section and the first fan nacelle section of the VAFN.

With reference to FIG. 8, an interface 68 between the second fan nacelle section 54 and the first fan nacelle section 52 includes a ring flange 72 of the circular ring portion 64 which is rotationally trapped between the first fan nacelle section 52 and a fairing 74 attached to the first fan nacelle section 52. The fairing 74 defines an outer aerodynamic surface for the bypass flow B. The fairing 74 includes a radial faring flange 76 and the first fan nacelle section 52 includes a radial nacelle flange 78 between which the radial faring flange 76 is slidably located. In one non-limiting embodiment, the ring flange 72 extends in an inboard direction while the radial faring flange 76 and the radial nacelle flange 78 extend in an outboard direction relative the axis A. It should be understood that various friction reduction elements such as bearing and slider surfaces may additionally be provided.

Figure 9:
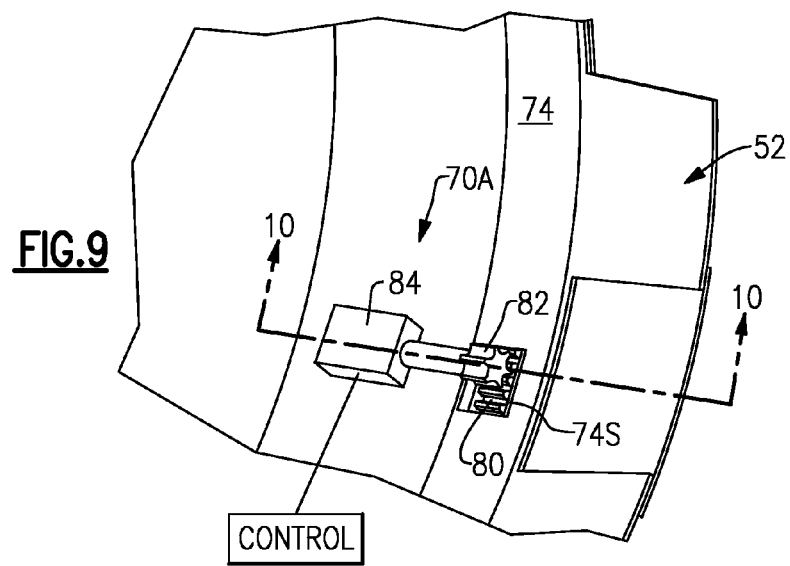
FIG. 9 is an inner perspective view of one non-limiting embodiment of an actuator system for the VAFN.
Figure 10:
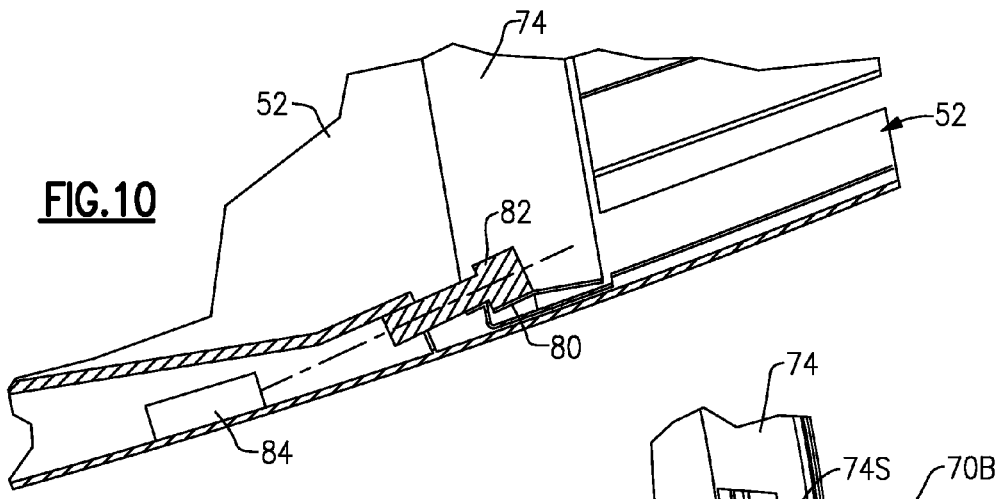
FIG. 10 is a sectional view of the actuator system taken along line 10-10 in FIG. 9.

With reference to FIG. 9, one non-limiting embodiment of the actuator system 70A includes a gear rack 80 on the second fan nacelle section 54 which meshes with a pinion gear 82. A slot 74S in the faring 74 provides access to the gear rack 80 (FIG. 10). The pinion gear 82 is translated by an actuator 84 such as a hydraulic, electric or pneumatic drive. It should be understood that although the actuator 84 is illustrated schematically, the actuator 84 may alternatively be positioned within the first fan nacelle section 52 such that the actuator 84 is within the outer aerodynamic surface which bounds the bypass flow B. Rotation of the pinion gear 82 drives the gear rack 80 and thereby position the fan nacelle section 54 relative to the first fan nacelle section 52 between a closed position and an open position (FIGS. 6A and 6B).

Figure 11:
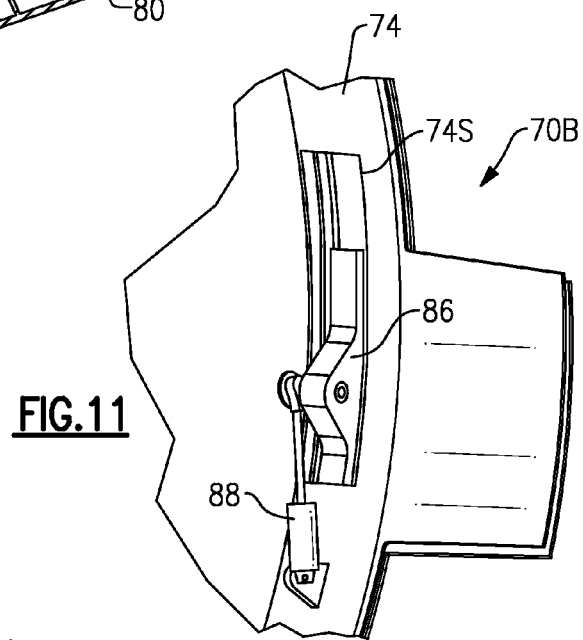
FIG. 11 is an inner perspective view of another non-limiting embodiment of an actuator system for the VAFN.
Figure 12:
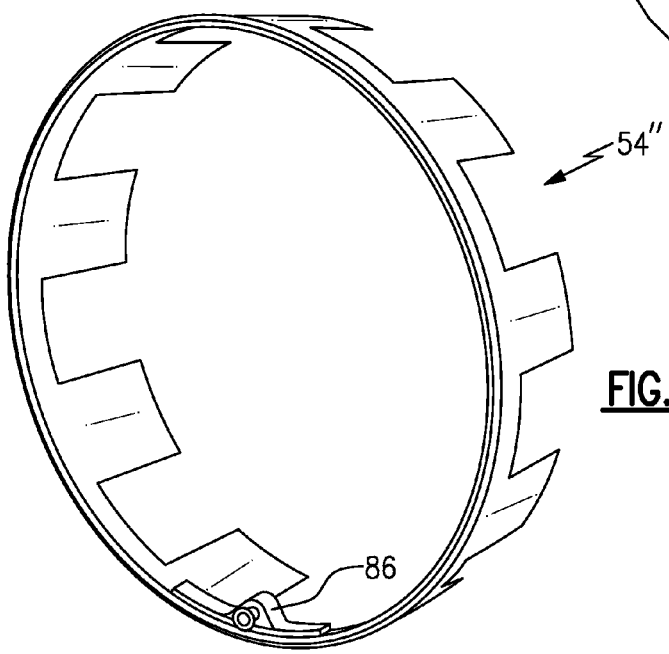
FIG. 12 is a perspective view of the VAFN fan nacelle section in FIG. 11.

With reference to FIG. 11, another non-limiting embodiment of the actuator system 70B includes a mount 86 on the second fan nacelle section 54" (FIG. 12) which is directly actuated. That is, the mount 86 receives, for example, a push/pull input by an actuator 88 such as a linear actuator to position the fan nacelle section 54 relative to the first fan nacelle section 52 between a closed position and an open position (FIGS. 6A and 6B). A slot 74S in the fairing 74 provides access for the mount 86 (FIG. 12). It should be understood that although the actuator 88 is illustrated schematically and may alternatively be positioned within the first fan nacelle section 52 such that the actuator 88 is within the outer aerodynamic surface which bounds the bypass flow B.

Figure 13:
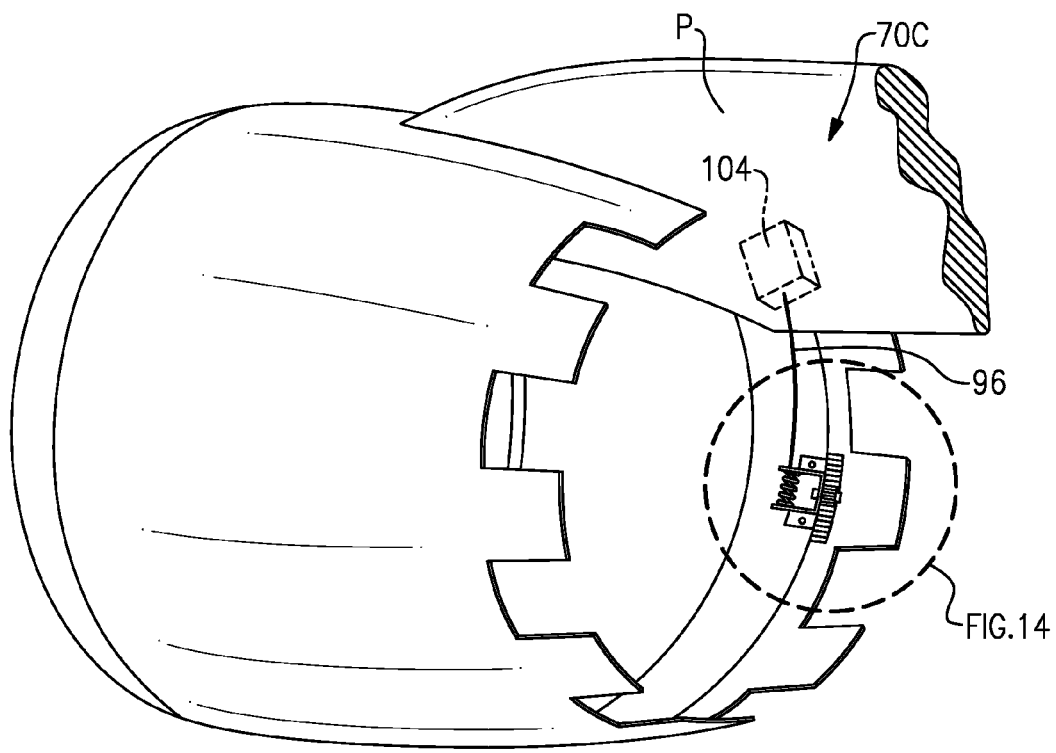
FIG. 13 is an inner perspective view of another non-limiting embodiment of an actuator system for the VAFN.
Figure 14:
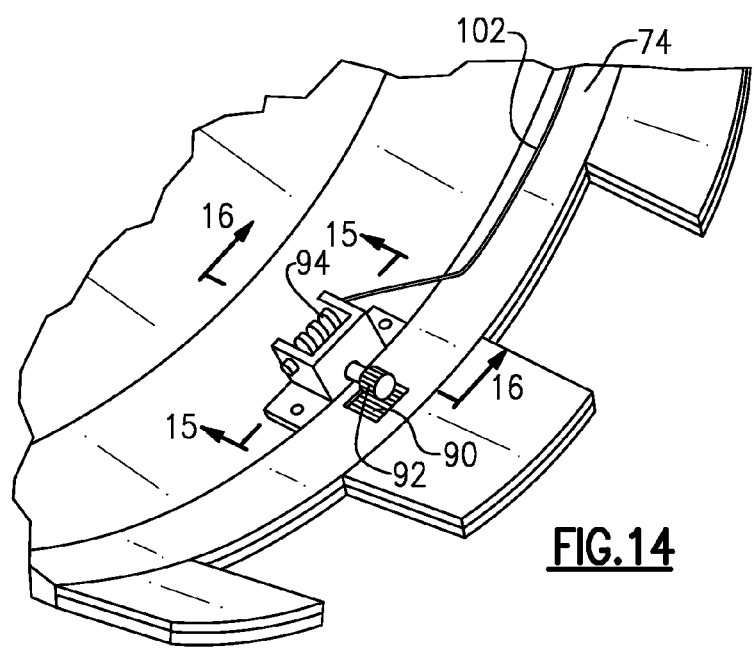
FIG. 14 is an expanded perspective view of the VAFN fan nacelle section in FIG. 13.
Figure 15:
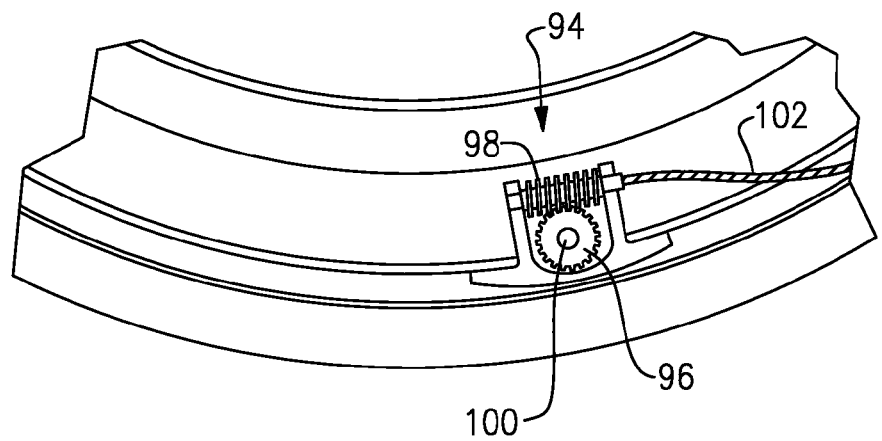
FIG. 15 is a sectional view of the actuator system taken along line 15-15 in FIG. 14.
Figure 16:
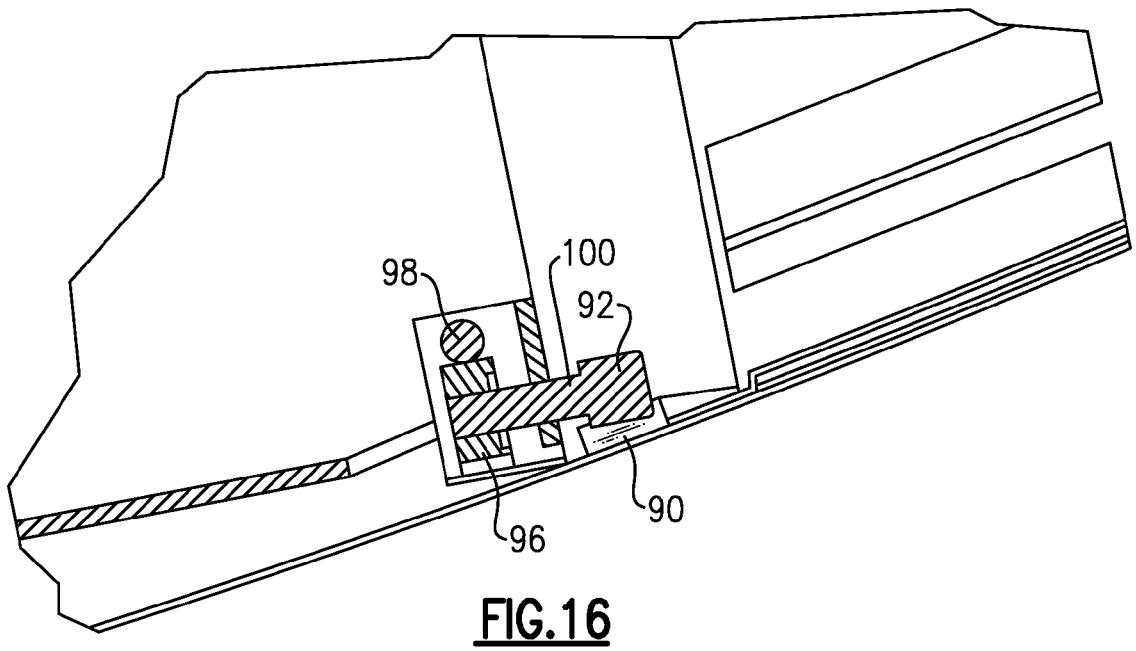
FIG. 16 is a sectional view of the actuator system taken along line 16-16 in FIG. 14.

With reference to FIG. 13, another non-limiting embodiment of the actuator system 70C, includes a gear rack 90 on the second fan nacelle section 54 meshes with a pinion gear 92 driven by a gear system 94 (FIG. 14). The gear system may include a pinion gear 96 on a common shaft 100 with the pinion gear 92 such that a worm gear 98 drives the pinion gear 96 (FIGS. 16 and 17). The worm gear 94 is remotely driven through a flexible shaft 102 powered by an actuator 104 such as a hydraulic, electric or pneumatic drive. The flexible shaft 102 facilitates location of the actuator 104 in a remote location such as within the engine pylon P. Rotation of the flexible shaft 102 by the actuator 104 drives the worm gear 98. The worm gear drives the pinion gear 96 to drive the pinion gear 92 and thus the gear rack 90 to thereby position the fan nacelle section 54 relative to the first fan nacelle section 52 between a closed position and an open position (FIGS. 6A and 6B).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A nacelle assembly for a gas turbine engine comprising:
a core nacelle defined about an engine centerline axis;
a fan nacelle mounted at least partially around said core nacelle to define a fan bypass flow path;
a variable area fan nozzle in communication with said fan bypass flow path, said variable area fan nozzle having a first fan nacelle section and a second fan nacelle section, said first fan nacelle section defines an intermittent trailing edge which defines a multiple of ports and said second fan nacelle section defines a multiple of doors, each of said multiple of doors match each of said multiple of ports such that a fan nacelle trailing edge is continuous when said second fan nacelle section is in a closed position relative to said first fan nacelle section; and
an actuator operable to move said variable area fan nozzle between the closed position and an open position, said actuator including an actuator input engaging a mating actuator receiver, at least one of said actuator input and said actuator receiver extending through an access slot in a circumferential fairing.

2. The assembly as recited in claim 1, wherein said first fan nacelle section and said second fan nacelle define said fan nacelle trailing edge.

3. The assembly as recited in claim 1, wherein each of said multiple of ports defines a port trailing edge axially forward of a fan nacelle trailing edge of said first fan nacelle section, each of said multiple of doors defines a door trailing edge aligned with a fan nacelle trailing edge of said first fan nacelle section, said second fan nacelle section translatable relative to said first fan nacelle section between said closed position in which said multiple of ports are closed by said multiple of doors, and an open position in which said multiple of doors at least partially overlap said intermittent trailing edge such that said multiple of ports are at least partially open.

4. The assembly as recited in claim 1, wherein said first fan nacelle section defines a saw tooth trailing edge of said fan nacelle.

5. The assembly as recited in claim 1, wherein each said multiple of ports are rectilinear.

6. The assembly as recited in claim 1, wherein each of said multiple of ports defines a trailing edge forward of said fan nacelle trailing edge.

7. The assembly as recited in claim 1, wherein said actuator input is a pinion gear and said actuator receiver is a gear rack meshing with said pinion gear.

8. The assembly as recited in claim 1, wherein said actuator input is a push/pull input and said actuator receiver is a mount.

9. The assembly as recited in claim 1, wherein said circumferential fairing is forward of said multiple of ports.

10. The assembly as recited in claim 1, wherein said circumferential fairing is attached to said first fan nacelle section axially forward of said multiple of ports, said circumferential fairing defining an outer aerodynamic surface of said fan bypass flow path.

11. The assembly as recited in claim 1, wherein said first fan nacelle section and said second fan nacelle section include a slidable interface there between, the interface including first and second radially-extending flanges and a third radially-extending flange axially interposed between said first and second radially-extending flanges.

12. A gas turbine engine comprising:
a core engine defined about an axis;
a turbofan mounted about said axis;
a core nacelle defined at least partially about said core engine;
a fan nacelle mounted at least partially around said core nacelle to define a fan bypass flow path;
a variable area fan nozzle in communication with said fan bypass flow path, said variable area fan nozzle having a first fan nacelle section and a second fan nacelle section, said first fan nacelle section defines an intermittent trailing edge which defines a multiple of ports and said second fan nacelle section defines a multiple of doors, each of said multiple of doors match each of said multiple of ports such that a fan nacelle trailing edge is continuous when said second fan nacelle section is selectively translated to a closed position relative to said fixed first fan nacelle section, said first fan nacelle section including a circumferential fairing having an access slot therein and said second fan nacelle section including a gear rack aligned with said access slot; and an actuator including a pinion gear meshing with said gear rack through said access slot, said actuator operable to translate said second fan nacelle section and move said multiple of doors relative to said multiple of ports.

13. The gas turbine engine as recited in claim 12, wherein each of said multiple of ports defines a port trailing edge axially forward of a fan nacelle trailing edge of said first fan nacelle section, each of said multiple of doors defines a door trailing edge aligned with a fan nacelle trailing edge of said first fan nacelle section, said second fan nacelle section translatable relative to said first fan nacelle section between said closed position in which said multiple of ports are closed by said multiple of doors, and an open position in which said multiple of doors at least partially overlap said intermittent trailing edge such that said multiple of ports are at least partially open.

14. The gas turbine engine as recited in claim 12, wherein said first fan nacelle section and said second fan nacelle define said fan nacelle trailing edge.

15. The assembly as recited in claim 12, wherein said circumferential fairing is attached to said first fan nacelle section axially forward of said multiple of ports, said circumferential fairing defining an outer aerodynamic surface of said fan bypass flow path.

16. The gas turbine engine as recited in claim 14, wherein said second fan nacelle section includes two ring portions which correspond with two sectors defined between an engine pylon and a lower Bi-Fi splitter.

17. A method of varying a nozzle of a gas turbine engine comprising:

using an actuator, selectively translating a second fan nacelle section that defines a multiple of doors relative a first fan nacelle section having a multiple of ports such that a fan nacelle trailing edge is continuous when the second fan nacelle section is at a closed position and is intermittent when at an open position, said actuator including an actuator input engaging a mating actuator receiver, at least one of said actuator input and said actuator receiver extending through an access slot in a circumferential fairing.

18. A method as recited in claim 17, further comprising:
maintaining a trailing edge of each of the multiple of doors in line with a trailing edge of the first fan nacelle section.

19. A method as recited in claim 17, further comprising:
matching the shape of each of the multiple of doors to each of the multiple of ports.

* * * * *